United States Patent Office 3,613,253
Patented Oct. 19, 1971

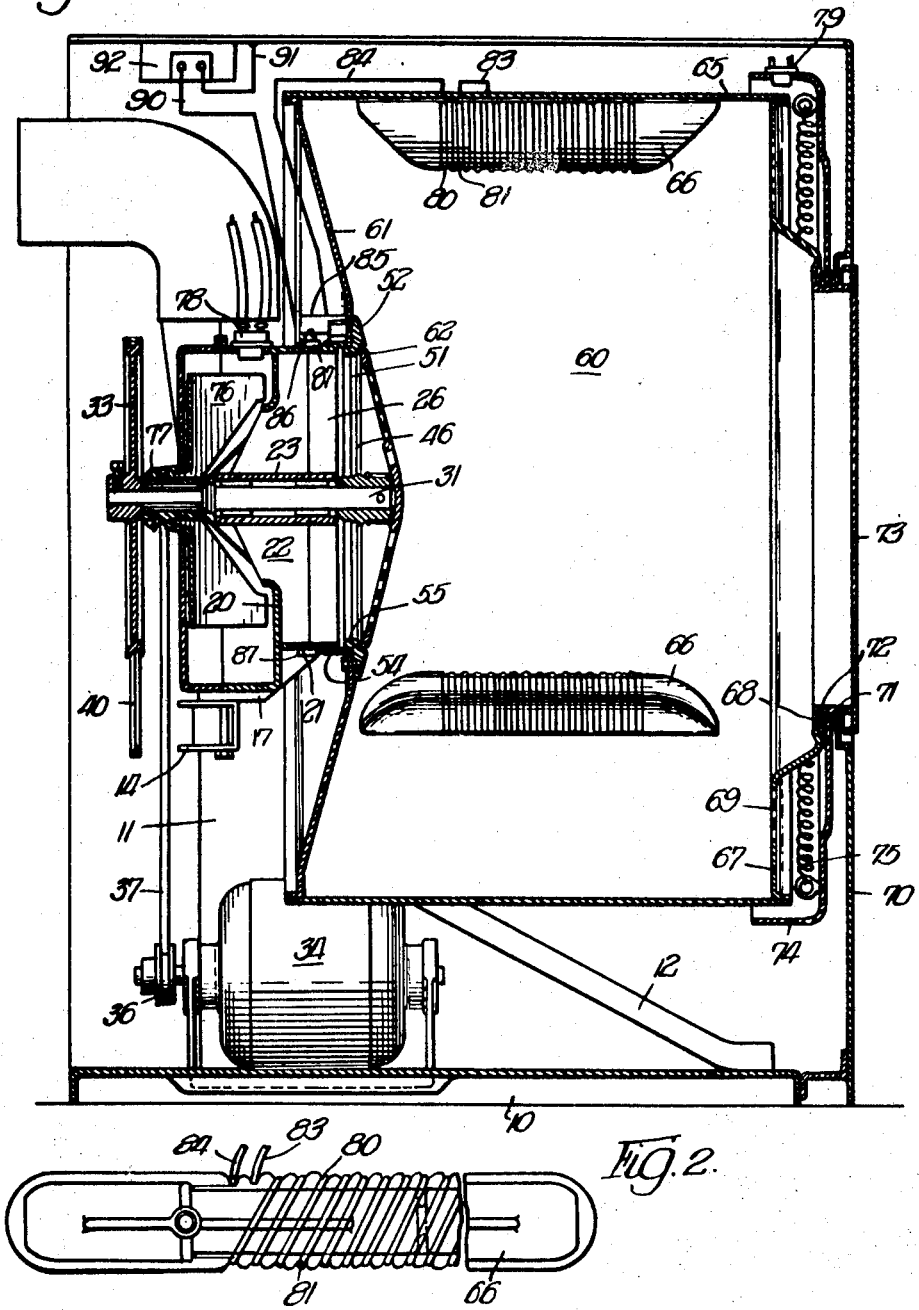

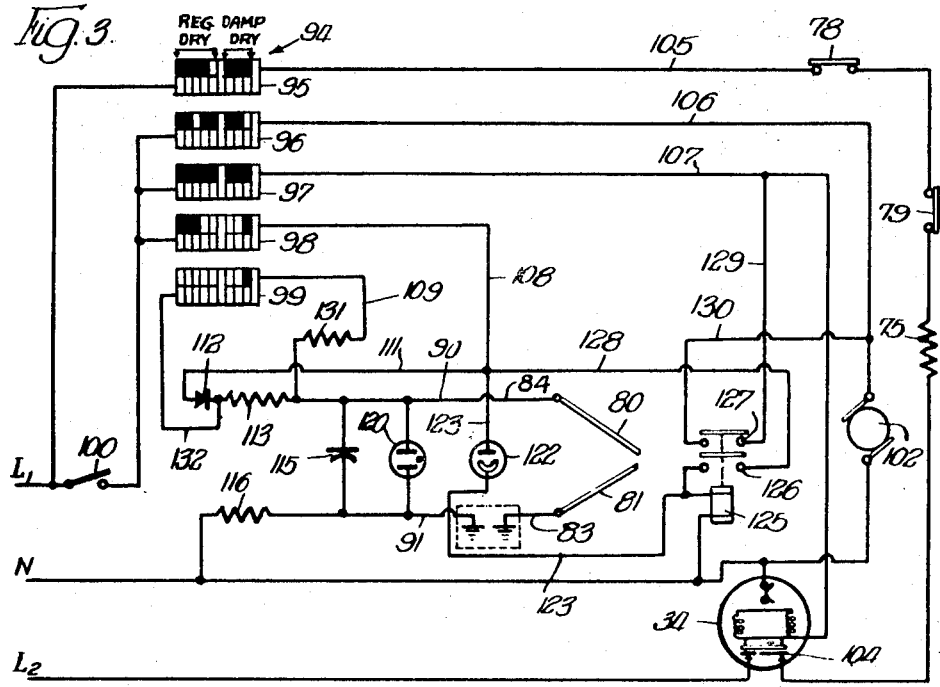
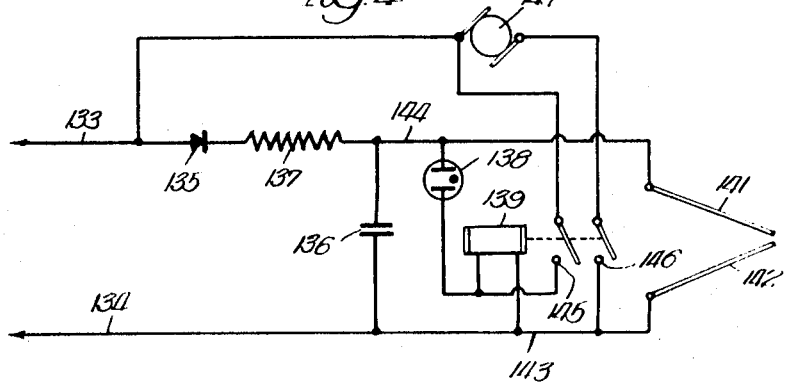

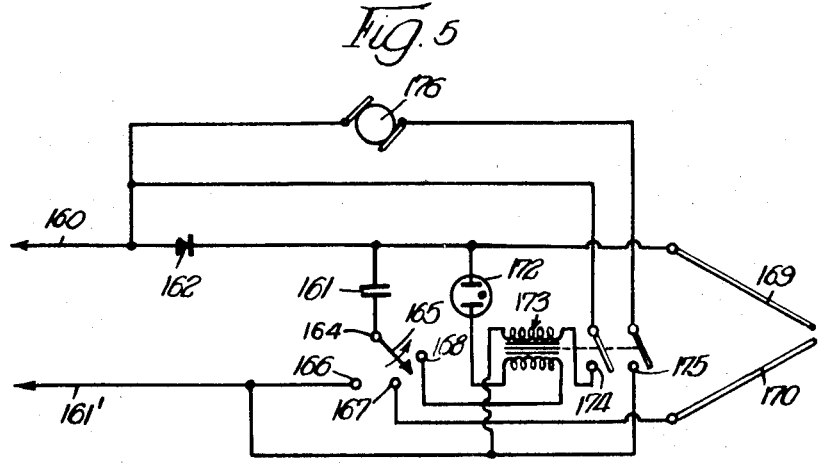
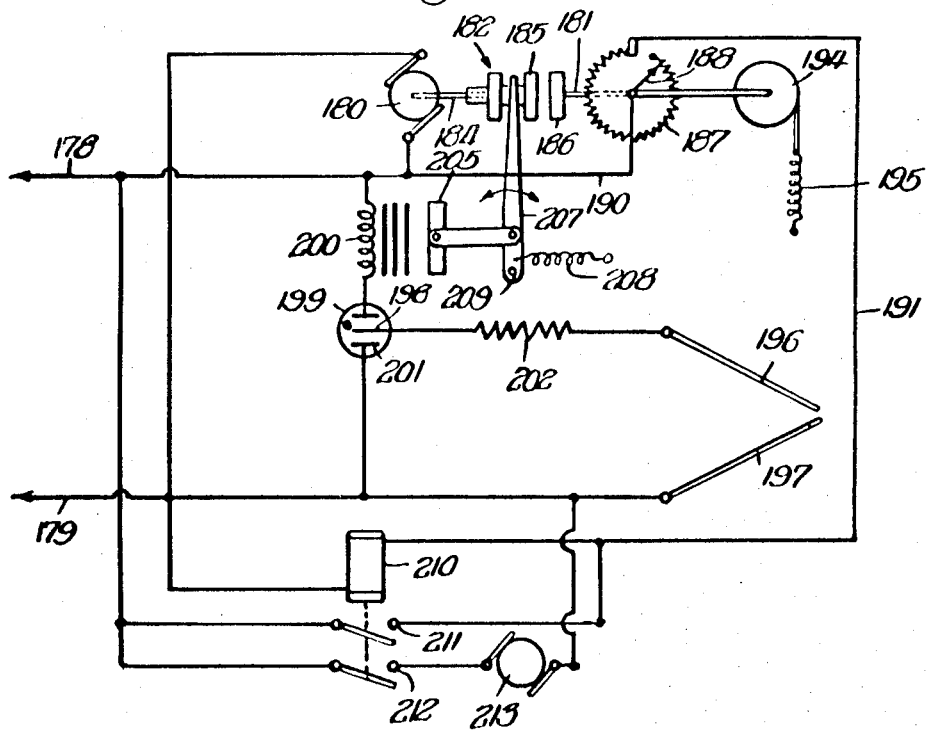

3,613,253
DRIER CONTROL
Thomas R. Smith, Newton, Iowa, assignor to The
Maytag Company, Newton, Iowa
Application Dec. 9, 1963, Ser. No. 329,155, which is a
continuation of application Ser. No. 22,323, Apr. 14,
1960. Divided and this application Nov. 30, 1970, Ser.
No. 93,732
Int. Cl. F26b *13/10*
U.S. Cl. 34—45                                     13 Claims

ABSTRACT OF THE DISCLOSURE

This invention is directed to a control system useful in a clothes drier for providing a signal when articles being dried therein have reached a predetermined selected degree of dryness. Electrodes are positioned for contact with and completion of an electrical circuit through the articles being dried. Means connected to the electrodes are responsive to the electrical resistance of random samples of the articles to effectively sense the moisture content thereof and to produce a control signal at a selected article dryness condition. In one embodiment, motor-driven spring-biased storage means gradually accumulate potential energy as the sensing means indicates an increasing dryness condition and at a preselected degree of dryness effectively produces said control signal.

CROSS REFERENCE TO RELATED APPLICATIONS

This application is a division of Ser. No. 329,155 filed Dec. 9, 1963 which is a continuation of an earlier filed application Ser. No. 22,323 filed Apr. 14, 1960, now abandoned.

This invention relates to a control system in a machine for drying fabrics, and more particularly, to a system for automatically controlling termination of the drying operation after the fabrics have reached a predetermined degree of dryness.

Most of the conventional driers, especially of the home laundry type, regulate the drying period by a manually adjustable timer which is preset by the operator. The duration of the drying operation depends upon the judgment, or guess, of the operator as to the proper period for the desired degree of dryness. The results are inconsistent overdrying, underdrying, or, in the case of some fabrics, incomplete drying of particular pieces.

Heretofor, numerous control systems for domestic clothes driers have been attempted in an effort to obtain automatic termination of the drying operation in a domestic clothes drier after the fabrics have reached the desired dryness. One of the major problems facing any automatic control system is the difficulty in obtaining consistently completely dried loads of mixed fabrics as found in the home laundry, since different fabrics vary in their moisture retentivity. In addition, some fabrics have both light and heavy, thin and thick sections, to further complicate the problem.

One previous system has used the change in conductivity of the fabrics as the moisture is removed in order to discontinue operation of a drying machine at the moment electrical conductivity of the fabrics, as sensed directly between conductors in the drum, attains a predetermined value. This type of control causes premature shutoff of the machine before the clothes are completely dry, especially with mixed loads, which frequently occur in the home, because some of the pieces dry long before others and the wet pieces when enclosed in, or shielded by, drier pieces causes instantaneous premature shutoff of the machine. In this type of control, since the drier operates only if a damp fabric is continuously contacting the electrodes, if at any moment none of the electrodes, or probes, within the drier drum contact a damp piece, the control will operate immediately to institute termination of drying. For this reason the control is unrealiable, and unsatisfactory.

In other control systems, the humidity of the air within the drier is measured to determine when the drying operation should be terminated, instead of direct measurements of the electrical conductivity of the fabrics. Humidity determinations are an unreliable index of the condition of the fabrics, and control systems dependent thereon contain an inherent deficiency.

In still other systems attempts have been made to control the termination of the drying period by thermostats in the drier. In these system the thermostats operate to shut off the heaters when the temperature within the drying cabinet rises above a set value which occurs when most of the clothes have been dried. Again, the control does not insure that all of the fabrics have been dried.

It is an object of the present invention to provide a control system for a clothes drier responsive to the dry condition of the fabrics being treated. It is a further object of the invention to provide a system for controlling termination of a drying operation that is responsive to the isolated fabrics in a load, so as to obtain reliable shutoff of the drying operation. It is a still further object of the invention to provide a system whereby direct response of the control to the dryness or conductivity of fabrics is made practical or feasible for home laundry clothes driers. It is another object of the invention to provide a control system having a manually operable preselection adjustment which initiates termination of the drying operation when the clothes have reached the manually preselected condition of dryness, for example, when the fabrics are in damp dry condition suitable for ironing. Further objects and advantages of this invention will become evident as the description proceeds and from an examination of the accompanying drawings which illustrate several embodiments of the invention and in which similar numerals refer to similar parts throughout the several views.

In the drawings:

FIG. 1 is a view in vertical section, partly broken away, illustrating a drier which incorporates the control system of the invention;

FIG. 2 is a bottom view of one of the baffles shown in the drum of the drier in FIG. 1, illustrating the location of the electrodes;

FIG. 3 is a schematic diagram of a preferred circuit employing the principles of the control system of the present invention;

FIG. 4 is a schematic diagram of a modified form of circuit which may be used as a control employing the principles of the invention;

FIG. 5 is a schematic diagram of a modified form of circuit which may be used as a control employing the principles of the invention; and FIG. 6 is a schematic diagram of a modified form of circuit which may be used as a control employing the principles of the invention.

Briefly described, the invention relates to a control system in which conductors, electrodes, or probes, directly contact fabrics being dried, and control termination of the drying operation after their electrical resistance, or conductivity, dependent upon their condition of dryness, exceeds a predetermined value for a predetermined time.

In FIG. 1 of the accompanying drawings is shown a clothes drier having a base frame 10 which serves as a support for unstanding channel base members 11 and 12 which together with cross piece 14 support the hollow blower housing casting 17. Housing 17 includes a tubular portion 21, a divider wall 20 having a rearwardly flared inner portion defining an intake into an impeller chamber, and radially directed longitudinal webs 22 which converge toward each other to provide a retainer member 23. A passageway 26 is located between the tubular portion 21 and the bearing retainer member 23 which transverses the supporting webs 22.

Journalled within member 23 is a revoluble drum drive shaft 31 which projects from both ends of the housing 17. Affixed to drum drive shaft 31 at the rear of the cabinet is a large pulley 33 which is driven by motor 34 through motor pulley 36, main drive belt 37, a speed reduction system (not shown) and belt 40.

The opposite or forward end of the drum drive shaft 31 is rigidly connected to the drum spider member 46 which has radiating spokes 51 that support rim 52. A heat resistant sealing member 54 encircles the front periphery of blower housing 17 and the circular shoulder 55 located on the rear portion of drum spider 46.

A horizontally mounted tumbling drum 60 has a rear wall 61 which is secured to rim 52 for support and rotation by shaft 31. Rear drum wall 61 is imperforate except for a central exhaust opening 62.

The periphery of rear wall 61 is flanged to form a supporting shoulder for the imperforate cylindrical sidewall 65 which carries the clothes elevating vanes 66 for tumbling clothing within drum 60 during rotation of the latter member. Cylindrical sidewall 65 is connected to the front drum wall 67.

Front wall 67 has a centrally located access opening 68 and a circular perforate portion 69 located concentrically to access opening 68. This perforate portion 69, formed by several concentric rows of holes, serves as the air intake into drum 60.

The cabinet 70 which is fastened to base frame 10 and which encloses the entire drying mechanism has an access opening 71 aligned to drum access opening 68 thereby allowing both of openings 68 and 71 to receive the door gasket 72. The door 73 is hinged and forms an airtight seal with gasket 72.

Fastened to cabinet 70 is the shroud or cowling member 74. Located between shroud 74 and the front drum wall 67 is an open coil electric heating element 75 which extends completely around the inside of cowling member 74 to raise the temperature of air passing through perforate portion 69 in the front drum wall 67. It will be understood that a gas heater may be used in place of the electrical element.

Airflow into drum 60 through the perforate area 69 and into the blower housing 17 is produced by rotation of the revoluble impeller member 76 located in blower housing 17. Fan pulley 77 is connected to the driving motor 34 by main drive belt 37. The blower housing casting 17 supports a cycling thermostat 78 which is connected in series with the heating element 75 in order to maintain the interior of drum 60 at the proper selected drying temperature. In practice, this switch is set to open at approximately 135°.

Also connected in series with the heating element 75 is the high limit switch 79 which is mounted on an upper part of shroud member 74 so as to disconnect heating element 75 from its source of power in case the temperature near the front of the drum should rise above a predetermined selected temperature during the operation of the clothes drier, for instance, in the event of reduced airflow through drum 60.

In order to measure the electrical conductivity or resistance for determining the condition of dryness of the fabrics, electrodes or probes 80, 81 are mounted within the drum 60. In the form shown, the electrodes are spirally wound about each of the drum baffles 66 to provide a maximum amount of contacting or probing surfaces exposed to the fabrics placed within the drum. As best illustrated in FIG. 2, the electrodes are preferably set in recesses or grooves in the baffles to prevent shorting therebetween by metallic objects sometimes attached to the fabrics, for example, metal buttons, clips, buckles, and the like. It will be realized that different forms of electrodes, or probes, may be used, although the type disclosed herein is preferred.

Electrical energy is supplied to electrode 80 by lead 84 that is connected to brush 85 which engages the stationary slip ring 86 while the drum 60 is rotating. The slip ring 86 may be supported on an electrically insulative band 87 mounted on housing 17. Slip ring 86 is in turn connected to a lead 90 which runs to the control unit 92. Electrode 81 may also be supplied with electrical energy of the opposite polarity to electrode 80 by lead 83 that may be connected to a similar arrangement of brushes and slip rings. It is preferred, however, to ground electrode 81 to the rotatable drum 60, so that it is supplied by current from lead 91 which is also grounded to the framework of the drier.

The automatic control unit 92 may be secured to the upper portion of the cabinet. Leads 90, 91 enter the control unit and are connected to the control circuit to be described hereinafter.

It will be noted that the baffles 66 are formed of electrically non-conductive material in order to insulate the electrodes. However, the electrodes are electrically shorted by contacting the wet fabrics during tumbling. Ordinarily, a plurality of baffles 66 are mounted within the drum 60, each of which is provided with electrodes 80, 81, and the respective electrodes of all the baffles connected in parallel.

Referring now to FIG. 3 which illustrates the automatic control circuitry, there is shown diagrammatically a timing cam stack 94 for controlling the drying operation. The cam stack has five cam switches 95 to 99 in which cam switch 95 controls the heater, cam switch 96 the timer motor, cam switch 97 the drive motor, cam switch 98 the sensing circuit, and cam switch 99 the damp dry setting.

It will be noted that the cam stack has "regular dry" and "damp dry" settings, either of which may be preselected through manual operation of a knob (not shown) by the operator. It should be clear that the cam stack may include other selections, for example, for wash and wear fabrics, air fluff, and special loads.

The cam stack 94 is advanced by a timer motor mechanism 102 in three minute intervals, each of which three minute interval is represented by the vertical lines in the cam stack 94 in the drawing. The shaded areas in the drawing indicate that the circuit is completed, while the blank portions mean that the circuit is open at the time interval and for the cam switch specified.

The drier is energized by a conventional three wire system represented by power lines $L_1$, $L_2$ and N. The heater is connected between $L_1$ and $L_2$ for 220 volts A.C. by a circuit from $L_1$ through cam switch 95, line 105, thermostat 78, high limit switch 79 to one end of the heater 75. The other side of the heater is connected to power line $L_2$ through centrifugal switch 104 in motor 34. Centrifugal switch 104 is normally open. When motor 34 is rotated switch 104 is centrifugally closed to energize heater 75.

The timer motor 102 is energized by a circuit from power line $L_1$, on-off switch 100, cam switch 96, line 106 to one side of the timer motor 102. The other side of the timer motor is connected to power line N.

The drive motor is energized by a circuit from power line $L_1$, on-off switch 100, cam switch 97, line 107 to one side of the motor 34. The other side of the motor 34 is connected to the power line N.

The sensing circuit is energized by a circuit from power line $L_1$, on-off switch 100, cam switch 98, line 108.

The sensing circuit has a selenium half-wave rectifier 112 connected on one side to line 108 through line 111. The other side of the rectifier 112 is connected to capacitor 115 through a series resistor 113. The other side of the capacitor 115 is connected to power line N through series resistor 116. It will be noted that the electrodes 80, 81 within the drum are connected across the capacitor 115 by lines 90, 91. When the capacitor is charged by the D.C. circuit from the rectifier 112, it may be discharged by any conducting material placed across, and shorting, the electrodes 80, 81.

A gaseous discharge tube, such as a neon lamp 120 is connected across capacitor 115. Neon lamp 120 normally has an infinite resistance, however, when the charge on the capacitor 115 reaches a predetermined value, the gas is ionized and the circuit is conducted therethrough to produce visible discharge.

A light sensitive cell 122 is positioned to detect the discharge of the neon lamp 120. One side of the light sensitive cell 122 is connected by line 124 to line 108, and the other side of the light sensitive cell is connected to relay 125 through line 123. The other side of the relay 125 is fastened to power line N. Normally, when dark, the light sensitive cell 122 has a very high resistance. However, when it detects light, its resistance is greatly reduced and completes the circuit to energize relay 125.

Relay 125 operates switches 126 and 127. Switch 126 completes a holding circuit in order to maintain the relay 125 energized after the photo-electric cell 122 has been excited through the discharge of neon lamp 120. The holding circuit is from line 108 to line 128 through switch 126 to one side of the relay 125. The other side of the relay is connected to power line N.

Switch 127 controls the timer motor 102. When switch 127 is closed the timer motor is energized by a circuit from line 107, line 129, switch 127, line 130 to one side of timer motor 102. The other side of the timer motor 102 is connected to power line N.

It will be seen that the capacitor 115 is charged by a D.C. circuit through the rectifier 112 and series resistance 113, 116 to power line N. The rate at which the capacitor 115 is charged depends, among other factors, upon the value of resistors 113, 116. It has been found that if the power between $L_1$ and N is 110 volts 60 cycle alternating current, the capacitor 115 may be a 6 microfarads paper condenser and the total resistance of 113 and 116 is 31 megohms, or 30 and 1 megohms, respectively. The neon lamp in this arrangement may be designed to fire at 68 to 76 volts.

As the capacitor 115 is slowly charged through resistors 113, 116, it is also discharged through electrodes 80, 81 when the clothes are wet. However, as the clothes are dried, the average rate of discharge diminishes to a point at which the charge on the condenser reaches an amount which will fire the neon lamp 120. This operates the relay 125 through the photoelectric cell 122.

It will be apparent that resistors 113, 116 may be connected on the same side of capacitor 115. However, for safety reasons, it is better to divide the total resistance between the two sides of the capacitor.

From the foregoing, it is believed that the operation of the device is apparent. The operator opens the door 73 of the drier and inserts the fabrics in the drum 60. Next the cam timer is manually set to "regular dry" position and the on-off switch 100 is closed. When the timer is set to the beginning of the "regular dry" position, the heater line 105 is connected to power line $L_1$ through cam switch 95. Also timer motor line 106, drive motor line 107 and sensing circuit line 108 are all connected to power line $L_1$, if the on-off switch 100 is closed through cam switches 96 to 98, as indicated by the shaded areas in the cam stack 94. The drive motor 34 rotates the drum 60 to tumble the clothes therein by baffles 66. After a certain rotational speed is achieved by the drive motor 34, switch 104 is centrifugally operated to close the circuit to the heater 75.

The timer drive mechanism 102 when energized advances the cam stack 94 every three minutes. It will be noted that the timer drive mechanism 102 is maintained in energized position for a total of six minutes after which it is deenergized by the cam switch 96, as indicated by the blank area in the third three minute interval. When the timer drive mechanism is deenergized, continued operation of the drier is under control of the sensing circuit. The timer drive mechanism remains deenergized and the drier continues to operate until the timer drive mechanism is again energized to terminate the drying operation through actuation of the sensing circuit. With the timer drive mechanism deenergized, the drier operation continues with the heater energized, and the drive motor rotating to tumble the fabrics within the drum 60.

As long as the clothes remain wet, or sufficiently damp to effectively discharge the capacitor 115, the drying operation is maintained. Although the capacitor 115 is charged by the rectifier and through resistors 113, 116 it continues to be discharged by the fabrics shorting electrodes 80, 81. However, when the moisture is removed, the fabrics achieve increased electrical resistance and the charge on the capacitor 115 begins to accumulate. The buildup of the charge on capacitor 115 reaches a predetermined amount over a predetermined period of time of sufficient duration for all of the clothes within the drum to contact the electrodes during tumbling. Thus, if a damp fabric has been entrapped in dry fabrics, as the drum continues to rotate, the damp piece will eventually contact the electrodes 80, 81 and discharge the capacitor 115 to prevent termination of the drying operation. On the other hand, if the pieces are all dry, termination of the drying operation will be initiated.

One of the important features of the present invention is the time integration of the effective average resistance of the fabrics will fall across the probes with a predetermined average value necessary for initiating termination of the drying period. This reduces the occasion for premature termination of the drying operation.

After all of the fabrics have achieved a predetermined resistance for a predetermined period of time, the neon lamp 120 discharges. This excites light sensitive cell 122 to complete the circuit to the relay 125. When relay 125 is energized, it is maintained energized through the circuit completed through switch 126. The relay also completes a circuit through switch 127 to again energize the timer drive mechanism 102. The timer drive mechanism then begins to run through the remainder of the open interval in the timer cam switch 96 and for two additional three minute periods making a total of approximately six minutes. It should be noted that at the end of the first additional three minute interval the heater circuit is deenergized and at the end of the second three minute interval all remaining circuits are deenergized by the timer cam stack 94 and the drying operation discontinued.

The additional three minute heating period insures that the clothes will be completely dry, even in the folds or thick portions which are often found in fabrics of the home laundry. The last three minute period of operation without heat obtains a cooling period to bring the temperature of the clothes down to a comfortable handling temperature.

In the event the operator desires the clothes to be damp dry, a condition suitable for ironing, the timer cam stack 94 is manually positioned to "damp dry." In this position, operation of the device is similar to "regular dry" with two exceptions. The cam switch 99 connects resistor 131 in parallel to resistor 113. The circuit is completed by a line 132, cam switch 99, and line 109 to one side of resistor 131. The other side of resistor 131 is connected in parallel to resistor 133. Resistor 131 has, for example, a value of 330,000 ohms. This means that the total resistance in series with the capacitor 115 is substantially reduced. Thus, the capacitor 115 is charged at a greater rate. The increased rate at which the capacitor 115 is charged results in the neon lamp 120 being fired at a time when the resistance through the clothes as sensed by the electrodes 80, 81 indicates the clothes are still damp. The charge on the capacitor 115 accumulates more rapidly through the reduced value of the total resistance and overtakes the discharge through the electrodes at an earlier fabric resistance, so that the clothes are partially damp when the neon tube is discharged.

As in the instance of the "regular dry" position, in the "damp dry" position the relay 125 also completes a circuit through switch 127 to again energize the timer drive mechanism 102. The timer drive mechanism 102 then begins to run through the remainder of the open interval in the timer cam switch 96 at which time all circuits are de-energized. In this way, the clothes in the damp dry position are subjected to less heat before the drive motor is stopped, so that they contain the desired amount of moisture.

FIG. 4 shows a modified form of sensing circuit which may be employed in the control of FIG. 3. A rectifier 135 is connected on one side to a power line 133. The other side of the rectifier 135 is connected to the capacitor 136 through a series resistor 137. The other side of the capacitor 136 is connected to the power line 134.

The electrodes 141, 142, located within the drum of the drier, are connected across the capacitor 136 by lines 143, 144. Wen the capacitor 136 is charged by the D.C. circuit from the rectifier 135, it will be discharged by any conducting material placed across the electrodes, such as wet fabrics.

A gaseous discharge tube 138 and a relay 139 are connected between lines 143, 144 across the capacitor 136. The relay contacts 145, 146, normally open, are closed when the relay 139 is energized when the gaseous tube 138 becomes conductive. Contact 145 is in series with a holding circuit to maintain the relay 139 closed after the gaseous tube 138 has fired. Contact 146 connects the timer motor 147 of the control circuit to the power line 134. The other side of the timer motor is connected to the power line 133.

In operation, the sensing circuit of FIG. 4 operates to fire the gaseous tube 138 when the resistance of the clothes, as determined by the electrodes 141, 142, reaches a predetermined value. During the time the clothes are tumbled, the capacitor 136 is gradually charged by a D.C. circuit through the rectifier 135 and through the series resistance 137 at a rate which is less than the discharge from the capacitor through the electrodes 141, 142 when the clothes are wet, however, when the clothes reach a predetermined dryness the capacitor 136 is charged faster than it is discharged through the electrodes. When the capacitor charge accumulates to a predetermined value, the discharge tube fires to energize relay 139. The relay is kept energized by holding circuit through relay switch 145. Relay switch 146 completes the circuit to the timing motor 147 which initiates the termination of the drying operation.

An alternative form of sensing circuit is shown in FIG. 5 in which a half-wave rectifier 162 is connected on one side to power line 160. The other side of the rectifier 162 is connected to a capacitor 161. The opposite side of the capacitor 161 is connected to a rotor switch 164. Rotor switch 164 has a switch blade 165 rotated by a drive mechanism (not shown). The switch blade 165 successively and alternately engages contacts 166, 167 and 168.

Switch contact 166 is connected to the other side of the power line 161' so that when the switch blade engages contact 166, capacitor 161 is charged through the rectifier 162. The switch blade, as it continues to rotate, opens the circuit to the power line 161' and contacts the contact 167 which connects the capacitor 161 across electrodes 169, 170, located within the drum of the clothes drier, in order to contact the tumbling clothes. If the clothes are wet the capacitor will be discharged through the electrodes 169, 170, when switch blade 165 engages contact 167. Delay time of switch blade 165 on contact 167 may be varied to obtain the desired dampness of the clothing. On the other hand, if the clothes are dry, the capacitor will retain its charge.

The switch blade 165 next touches contact 168 which places the capacitor 161 across the circuit which has in series a gaseous tube 172 and relay 173. If the charge on the capacitor 161 is nil, or only of small value, because it has been discharged through the clothes, the gaseous tube is undisturbed. However, if the capacitor 161 has built up a certain charge, as determined by the value of the gaseous tube 172, the tube 172 will fire and energize relay 173. When the relay 173 is energized, contacts 174, 175 are closed. Contact 174 completes a holding circuit to maintain the relay energized, while contact 175 energizes the timing motor 176 to initiate termination of the drying operation.

The sensing circuit of FIG. 5 is the subject matter of an application, Ser. No. 39,062, filed June 27, 1960, refiled Dec. 30, 1963, as Ser. No. 334,086 and now Pat. No. 3,221,417 assigned to the same assignee as the instant application.

Yet another form of the sensing circuit is shown in FIG. 6 of the drawing. In the sensing circuit of FIG. 6, a motor 180 is connected to power lines 178 and 179. Motor shaft 184 of motor 180 drives a shaft 181 through a slip clutch 182. The slip clutch has a movable clutch face 185 splined on motor shaft 184 for longitudinal movements along its axis. An opposite clutch face 186 is non-rotatably secured to the shaft 181.

A variable resistance 187 has a movable arm 188 driven by shaft 181. The variable resistance is connected at one end to line 191. The movable arm 188 is connected to power line 178 through line 190, so that the resistance in line 191 is changed from a high value to nil as the arm is rotated clockwise.

When the shaft 181 is rotated it moves against the bias of spring 195, which may be accomplished by winding a cable secured to wheel 194 and spring 195. When the shaft 181 is released, it is rotated counterclockwise and returned to starting position by the spring 195.

A three element gaseous tube 199 is connected in series with a solenoid 200 between the power lines 178, 179. The gaseous tube normally is not conducting, however, when its grid 198 receives a positive potential it becomes conducting. A pair of electrodes 196 and 197 are connected between the grid 198 and the cathode 201 of the three element gaseous tube. A grid resistor 202 is in series with the grid and electrode 196. As long as the clothes are wet and electrically conducting, a current flows between the electrodes 196, 197 to apply a positive potential to the grid 198 which permits the gaseous tube 199 to conduct current between the power lines 178, 179 to energize the solenoid 200. However, when the clothes are dry and non-conducting, the grid receives a negative potential which does not permit the tube to fire, so that the solenoid 200 remains deenergized.

The lever 207 is normally urged clockwise about pivot pin 209 by a spring 208, so that the friction face 185 splined on the motor shaft 184 contacts friction face 186 on shaft 181. However, when the armature 205 is moved by the solenoid 200 through energization of the solenoid 200, the friction face 185 is disengaged from friction face 186 by movement of the lever 207 in a counterclockwise direction.

A relay 210 is mounted in the line 191 having contacts 211, 212. Contact 211 completes a holding circuit, and contact 212 connects timer 213 to the power line.

Operation of the sensing circuit shown in FIG. 6 is as follows. The relay 210 remains deenergized since it has in series therewith resistance 187. Motor 180 is constantly rotating and when the clutch 182 is engaged, the arm 188 is turned to decrease the resistance in series with the relay 210 to nil. However, as long as the clothes are wet, the gaseous tube 199 will fire to energize solenoid 200 and disengage the clutch 182 through operation of the solenoid armature 205. Lever 207 then moves against the bias of spring 208 to disengage clutch 182 and spring 195. If isolated clothes come into contact with the electrodes before the arm 188 of resistance 187 has swung completely around to short out the resistance 187, the clutch is disengaged to permit the spring 195 to move the resistance arm to full value. It is evident that the resistance 187 can also be eliminated and the time of movement of the arm 188 from an "O" position to a contact with line 191 used to provide the time delay. When the clothes become completely dry, the clutch is engaged for a period of time sufficient for the arm 188 to swing in to contact line 191, thereby effectively eliminating the resistance 187. The relay 210 is then energized to close contacts 211, 212. Contact 211 maintains the relay energized, while contact 212 energizes a timing motor 213 which initiates the termination of the drying operation.

In the drawings and specification there has been set forth a preferred embodiment of the invention, and although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit or scope of this invention as further defined in the following claims.

I claim:

1. In a drying apparatus, movable means for carrying the articles to be dried, electrodes positioned for contacting and completing an electrical circuit through said articles carried by said movable means, mechanical storage means for accumulating potential energy, means responsive to wet articles across said electrodes for discharging said potential energy, means for charging said storage means with potential energy at a rate which exceeds the discharge thereof when the articles contacting said electrodes are at least partly dried, and means responsive to a predetermined amount of energy accumulated by said storage means for controlling said drying apparatus.

2. In a drying machine, a chamber for articles to be dried, means for drying said articles in said chamber during at least a portion of a cycle of operations, electrodes for contacting and completing an electrical circuit through said articles, said electrodes being spaced apart and adapted to receive therebetween the articles being dried so that the electrical resistance between said electrodes varies with the moisture condition of said articles therebetween, means applying electrical voltage to said electrodes, moving means in association with said chamber for causing relative movements and random contact between said electrodes and said articles to obtain a representative sampling of the electrical condition of the articles, timing means including rotatable means operable from a first position to a second position for initiating termination of said drying machine, means including a gaseous tube effectively responsive to wet articles across said electrodes for precluding operation of said rotatable means whereby the absence of wet articles across said electrodes permits said rotatable means to operate to said second position after a predetermined time period of rotation for initiating termination of operation of said drying machine.

3. In a drying machine, a chamber for articles to be dried, means for drying said articles in said chamber during at least a portion of a cycle of operations, electrodes for contacting and completing an electrical circuit through said articles, said electrodes being spaced apart and adapted to receive therebetween the articles being dried so that the electrical resistance between said electrodes varies with the moisture condition of said articles therebetween, means applying electrical voltage to said electrodes, moving means in association with said chamber for causing relative movements and random contact between said electrodes and said articles to obtain a representative sampling of the electrical condition of the articles, control means for initiating termination of said drying machine, rotatable integration means operable from a first position to a second position for actuating said control means, motive means for rotating said integration means from said first position to said second position, means including a gaseous tube and responsive to wet articles across said electrodes for effectively precluding rotation of said rotatable integration means whereby the absence of wet articles across said electrodes permits rotation of said rotatable integration means to said second position for actuating said control means and initiating termination of operation of said drying machine.

4. In a drying machine as defined in claim 3 and further including means for returning said rotatable integration means toward said first position when wet articles are across said electrodes.

5. In a drying machine as defined in claim 3 wherein said gaseous tube is energized in a circuit for preventing rotation of said rotatable integration means when the articles to be dried are wet and is deenergized for permitting rotation of said rotatable integration means when the articles are dry.

6. In a drying machine as defined in claim 3 wherein said means responsive to wet articles across said electrodes includes means for disengaging said motive means from said rotatable integration means to prevent rotation of said rotatable integration means when the articles across said electrodes are wet.

7. A control circuit in an appliance for drying of materials placed therein comprising: means forming a treatment zone for receiving the material to be dried, sensing means including electrodes positioned within the treatment zone to sense the electrical resistance of the material being dried, motive means for presenting random contacts between said electrodes and the material being dried to obtain a representative sampling of the electrical resistance of the material during the drying operation, gaseous tube means in circuit with said sensing means for energization when wet materials are contacting said electrodes and for deenergization when dry materials are contacting said electrodes, termination means for initiating the final program of the drying operation, motor driven means for rotation through a fixed angle in order to actuate said termination means, and means for controlling said motor driven means in order to prevent rotation thereof when said gaseous tube means is energized and to permit rotation thereof when said gaseous tube means is deenergized.

8. In a drying machine, a chamber for containing material to be dried, means for drying said material in said chamber, electrodes for contacting and completing an electrical circuit through said material, said electrodes spaced apart and adapted to receive therebetween the material being dried so that the electrical resistance between said electrodes varies with the electrical resistance condition of the material therebetween, means in association with said chamber for effecting relative movements and random contact between said electrodes and said material to obtain a representative sampling of the electrical condition of the material, motor driven means for rotation through a predetermined angle to control termination of said drying means, means controlled by the electrical resistance across said electrodes including a gaseous tube that is energized in a circuit for preventing operation of said motor driven means when the material to be dried is wet and that is deenergized for activating said motor driven means when the material is dry, and means responsive to rotation of said motor driven means a predetermined amount when said gaseous tube is deenergized for initiating termination of the operation of said drying means.

9. In a drying machine, a chamber for material to be dried, means for drying said material in said chamber, electrodes for contacting and completing an electrical circuit through said material, said electrodes spaced apart and adapted to receive therebetween the material being dried so that the electrical resistance between said electrodes varies with the electrical resistance condition of the material therebetween, means for supplying electrical voltage to said electrodes, means in association with said chamber for effecting relative movements and random contact between said electrodes and said material to obtain a representative sampling of the electrical condition of the material, motor driven means rotatable a predetermined amount to control termination of a drying operation, means responsive to the electrical resistance across said electrodes including gaseous tube means that is energized in a circuit for inactivating said motor driven means when the material to be dried is wet and that is deenergized for activating said motor driven means when the materal is dry, and means responsive to the rotation of said motor driven means a certain amount when said gaseous tube means is deenergized for initiating termination of the drying operation of said drying machine.

10. In a drying machine, a chamber for containing material to be dried, means for drying said material in said chamber, electrodes for contacting and completing an electrical circuit through said material, said electrodes spaced apart and adapted to receive therebetween the material being dried so that the electrical resistance between said electrodes varies with the electrical resistance condition of the material therebetween, moving means in association with said chamber for causing relative movements and random contact between said electrodes and said material to obtain a representative sampling of the electrical condition of the material, storage means including spring means for accumulating potential energy, motor driven means for gradually charging said storage means with potential energy, means controlled by the electrical resistance across said electrodes for discharging the potential energy of said storage means when the material to be dried is wet, and means responsive to a predetermined amount of potential energy accumulated by said storage means for controlling an operation of said drying machine.

11. In a drying chamber, a chamber for material to be dried, means for drying said material in said chamber, electrodes for contacting and completing an electrical circuit through said material, said electrodes spaced apart and adapted to receive therebetween the material being dried so that the electrical resistance between said electrodes varies with the electrical resistance condition of the material therebetween, means for supplying electrical voltage to said electrodes, moving means in association with said chamber for causing relative movements and random contact between said electrodes and said material to obtain a representative sampling of the electrical condition of the material, storage means including spring means for accumulating potential energy, electrically controlled motor means for charging said storage means with potential energy, means controlled by the electrical resistance across said electrodes for discharging the potential energy of said storage means when the material to be dried is wet, and means responsive to a predetermined amount of potential energy accumulated by said storage means for controlling an operation of said drying machine.

12. A moisture sensing control adapted for use with a material drying apparatus in which said control is operative to indicate when the material during the treatment obtains a certain moisture content based on random samples, the combination comprising: spaced-apart electrodes connected to an electrical potential and adapted to contact the material being dried and to complete a circuit therethrough during a drying operation; means for presenting random portions of the material for bridging contact with said electrodes in order that the electrical resistance of representative samples of the material is shunted across said electrodes; termination means for initiating termination of said drying operation; integration means including means rotatable through a predetermined angle as a function of the integration of the moisture contents of the random portions of the material contacting and bridging said electrodes and operable for controlling actuation of said termination means; and means including circuit means connected to said electrodes and responsive to a condition of material moisture content for controlling said integration means.

13. In a drying machine, a chamber for articles to be dried, means for drying said articles in said chamber during at least a portion of a cycle of operations, electrodes for contacting and completing an electrical circuit through said articles, said electrodes being spaced apart and adapted to receive therebetween the articles being dried so that the electrical resistance between said electrodes varies with the moisture condition of said articles therebetween, means applying electrical voltage to said electrodes, moving means in association with said chamber for causing relative movements and random contact between said electrodes and said articles to obtain a representative sampling of the electrical condition of the articles, timing means including rotatable means operable from a first position to a second position for initiating termination of said drying machine, means effectively responsive to wet articles across said electrodes for precluding operation of said rotatable means whereby the absence of wet articles across said electrodes permits said rotatable means to operate to said second position after a predetermined time period of rotation for initiating termination of operation of said drying machine.

References Cited

UNITED STATES PATENTS 2,045,381   6/1936   Elberty _____ 34—45

CARROLL B. DORITY, Jr., Primary Examiner

U.S. Cl. X.R.

34—48; 324—65 M